(12) United States Patent
Hartman et al.

(10) Patent No.: US 7,652,879 B2
(45) Date of Patent: Jan. 26, 2010

(54) MODULAR COMPONENT AND BLANK COUPLING

(75) Inventors: Corey Hartman, Austin, TX (US); Raymond DeWine Heistand, II, Round Rock, TX (US); Joel J. Jaramillo, Round Rock, TX (US); Andrew T. Junkins, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 384 days.

(21) Appl. No.: 11/611,587

(22) Filed: Dec. 15, 2006

(65) Prior Publication Data

US 2008/0144271 A1    Jun. 19, 2008

(51) Int. Cl.
  *G06F 1/16* (2006.01)
  *A47B 81/00* (2006.01)
  *A47F 7/00* (2006.01)

(52) U.S. Cl. .............................. 361/679.39; 312/223.2; 211/26

(58) Field of Classification Search ......... 361/683–685, 361/724–727, 679.01–679.45, 679.55–679.59; 312/223.1, 223.2; 211/26
See application file for complete search history.

(56) References Cited

U.S. PATENT DOCUMENTS

| | | | |
|---|---|---|---|
| 4,908,715 A * | 3/1990 | Krum et al. .............. 360/97.02 |
| 6,236,563 B1 | 5/2001 | Buican et al. |
| 6,272,010 B1 | 8/2001 | Schmitt |
| 6,275,382 B1 | 8/2001 | Siedow et al. |
| 6,337,793 B1 | 1/2002 | Vier et al. |
| 6,442,020 B1 * | 8/2002 | Liu et al. .................... 361/683 |
| 6,580,604 B1 | 6/2003 | McAnally et al. |
| 6,621,696 B1 | 9/2003 | Wang |
| 6,667,880 B2 * | 12/2003 | Liu et al. ............... 361/679.35 |
| 6,724,620 B1 | 4/2004 | Arbogast et al. |
| 7,350,980 B2 * | 4/2008 | McCormack et al. ......... 385/53 |
| 2005/0094369 A1 * | 5/2005 | Chen et al. .................. 361/685 |
| 2005/0099767 A1 * | 5/2005 | Wu ............................ 361/685 |

\* cited by examiner

*Primary Examiner*—Jayprakash N Gandhi
*Assistant Examiner*—Nidhi Desai
(74) *Attorney, Agent, or Firm*—Haynes and Boone, LLP

(57) ABSTRACT

A modular component and blank coupling apparatus includes a chassis having a wall. A component bay is defined by the chassis and is located adjacent the wall. A plurality of guide channels are defined by the wall and are located adjacent the component bay. A single securing member is moveably coupled to the wall adjacent the plurality of guide channels, wherein the single securing member is operable to move into engagement with a modular component and a blank in order to secure the modular component and the blank to the chassis, and wherein the single securing member is operable to move out of engagement with the modular component and the blank in order to allow the modular component and the blank to be removed from the chassis. The single securing member provides one apparatus that may be used to couple both blanks and modular components to the chassis, and provides a single release mechanism to release those modular components and blanks from the chassis.

15 Claims, 12 Drawing Sheets

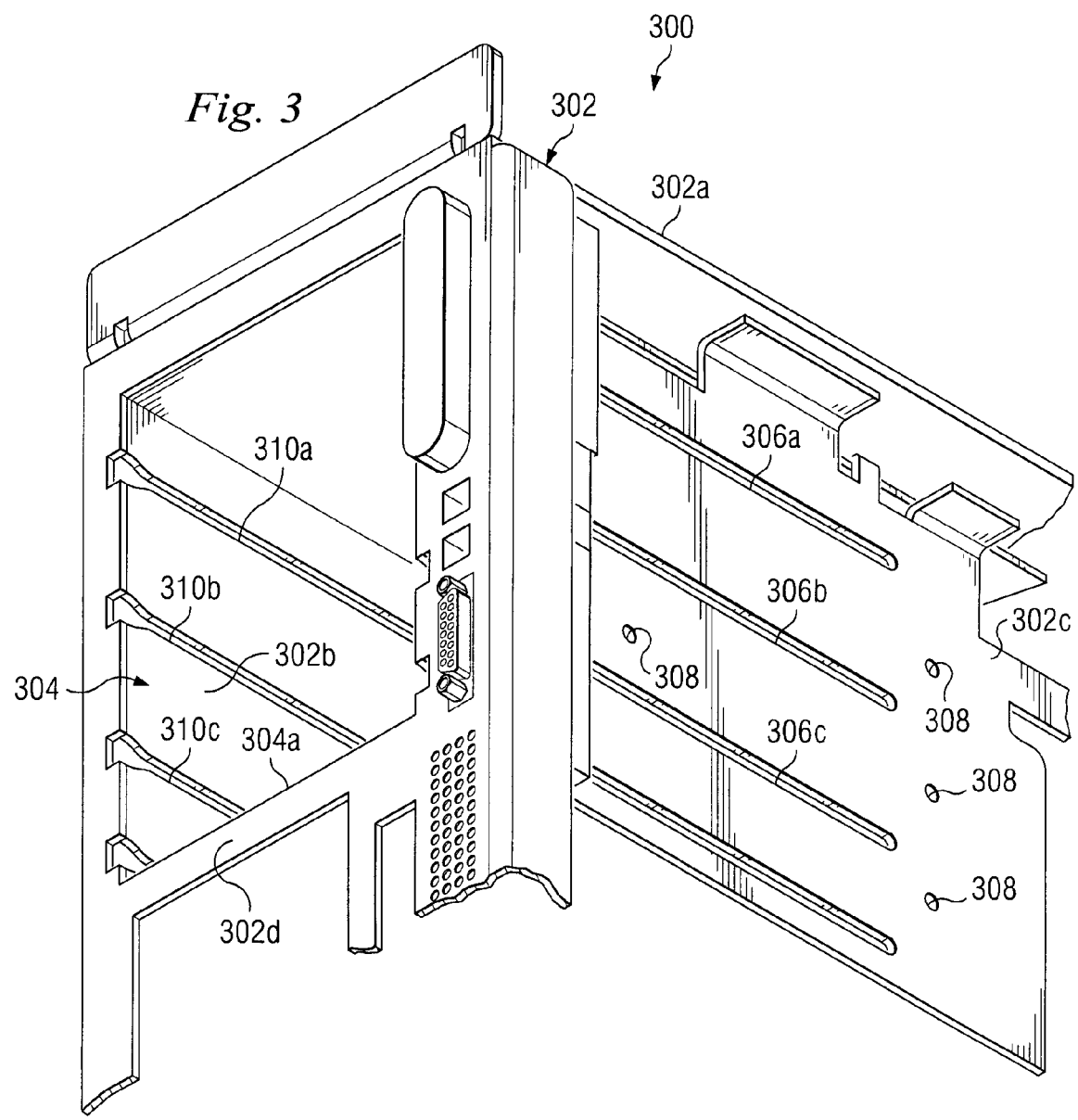

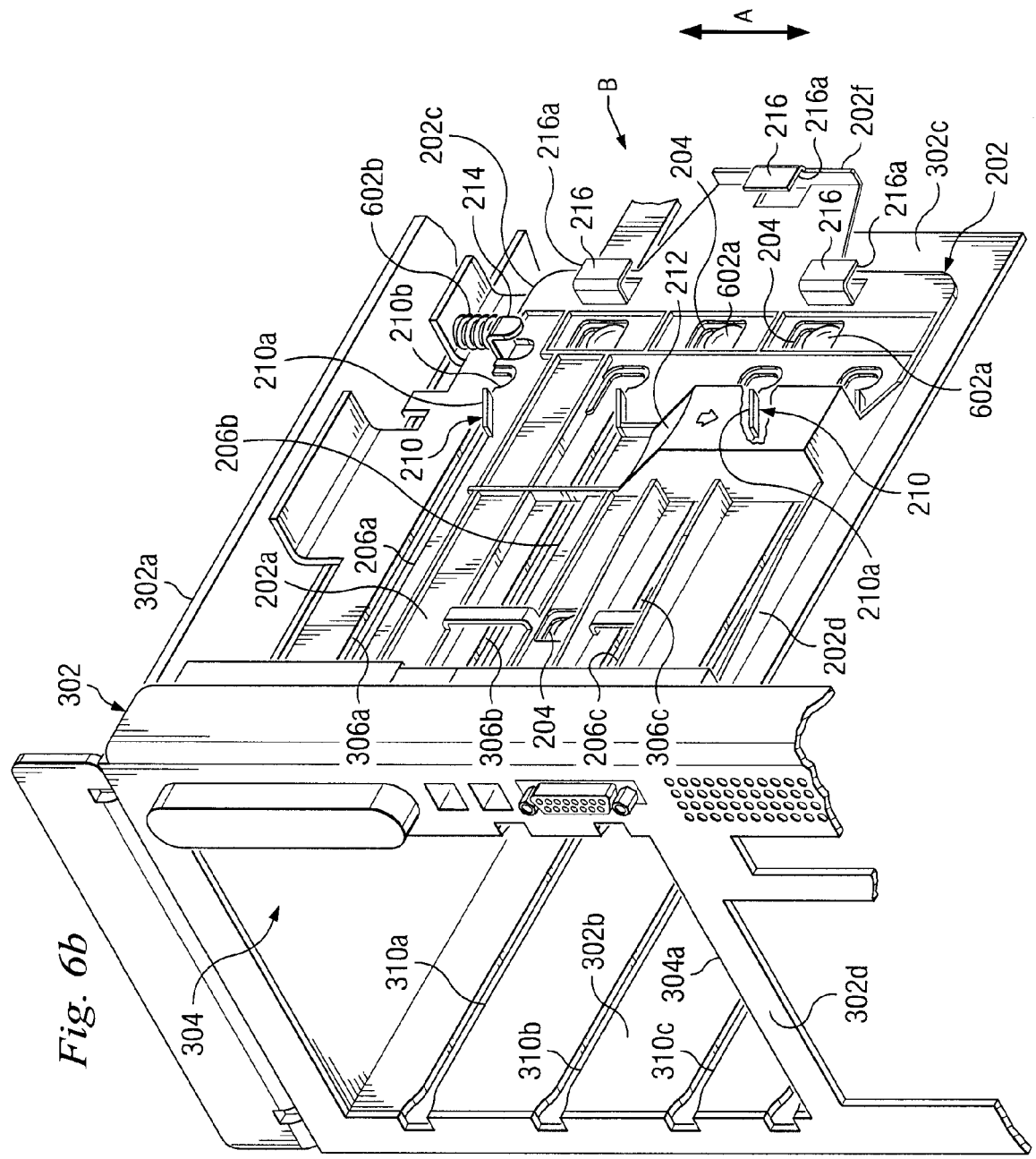

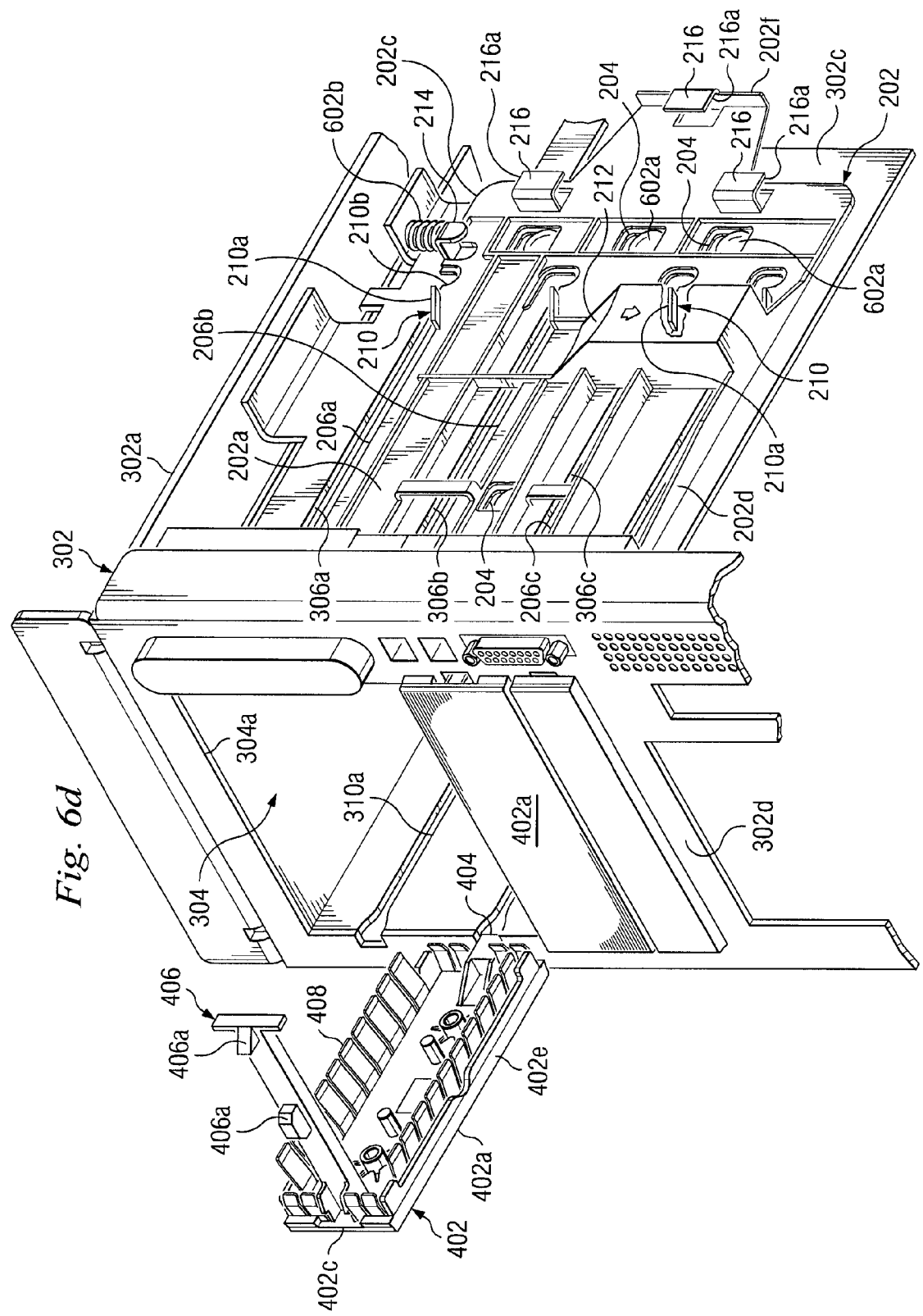

MODULAR COMPONENT AND BLANK COUPLING

BACKGROUND

The present disclosure relates generally to information handling systems, and more particularly to a modular component and blank coupling in an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Typically, IHSs include a chassis that defines a bay in which modular components such as, for example, media bay peripherals, may be coupled to the IHS. Blanks are typically coupled to the chassis in order to cover the opening to the bay when there is no modular component located in the bay. The coupling of these modular components and blanks to the chassis raises a number of issues.

Conventionally, the modular components are coupled to the chassis by engaging a guide post with a channel on the chassis and securing that guide post in the channel with a bay coupling mechanism at a location that is spaced apart a distance from the front edge of the chassis. The blanks are typically coupled to the chassis independently from the modular components by engaging a latch located on the front edge of the chassis.

However, some chassis include panels or other obstructions that prevent use of the front edge of the chassis for the securing of the blanks. Furthermore, cables may be located in the chassis that can cover up access points and obstruct the function of the bay coupling mechanisms in the chassis.

Accordingly, it would be desirable to provide for coupling modular components and blanks to an IHS chassis absent the disadvantages discussed above.

SUMMARY

According to one embodiment, a modular component and blank coupling apparatus includes a chassis comprising a wall, a component bay defined by the chassis and located adjacent the wall, a plurality of guide channels defined by the wall and located adjacent the component bay, and a single securing member moveably coupled to the wall adjacent the plurality of guide channels, wherein the single securing member is operable to move into engagement with a modular component and a blank in order to secure the modular component and the blank to the chassis, and wherein the single securing member is operable to move out of engagement with the modular component and the blank in order to allow the modular component and the blank to be removed from the chassis.

BRIEF DESCRIPTION OF THE DRAWINGS

FIG. 3 is a perspective view illustrating an embodiment of an IHS chassis used with the single securing member of FIG. 2.

FIG. 4b is a perspective view illustrating an embodiment of the blank of FIG. 4a.

FIG. 5b is a perspective view illustrating an embodiment of the modular component of FIG. 5a.

FIG. 6b is a perspective view illustrating an embodiment of the single securing member of FIG. 2 moveably coupled to the IHS chassis of FIG. 3.

FIG. 6d is a perspective view illustrating an embodiment of the blank of FIGS. 4a and 4b being coupled to the IHS chassis of FIG. 6b.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
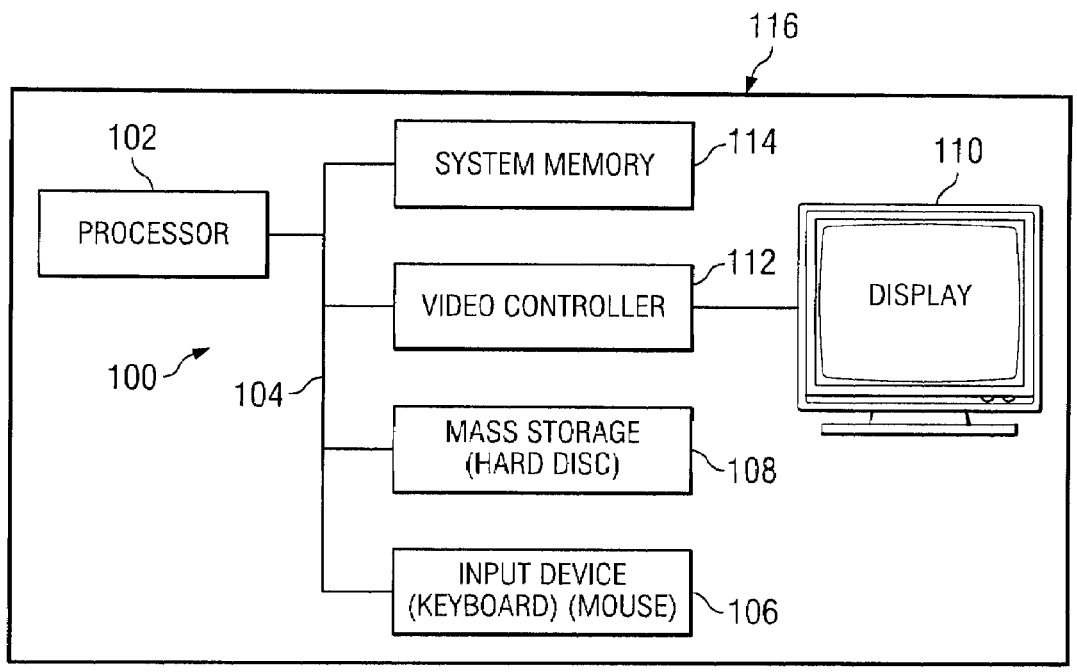
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of computer system 100. An input device 106 is coupled to processor 102 to provide input to processor 102. Examples of input devices include keyboards, touchscreens, and pointing devices such as mouses, trackballs and trackpads. Programs and data are stored on a mass storage device 108, which is coupled to processor 102. Mass storage devices include such devices as hard disks, optical disks, magneto-optical drives, floppy drives and the like. IHS 100 further includes a display 110, which is coupled to processor 102 by a video controller 112. A system memory 114 is coupled to processor 102 to provide the processor with fast storage to facilitate execution of computer programs by processor 102. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
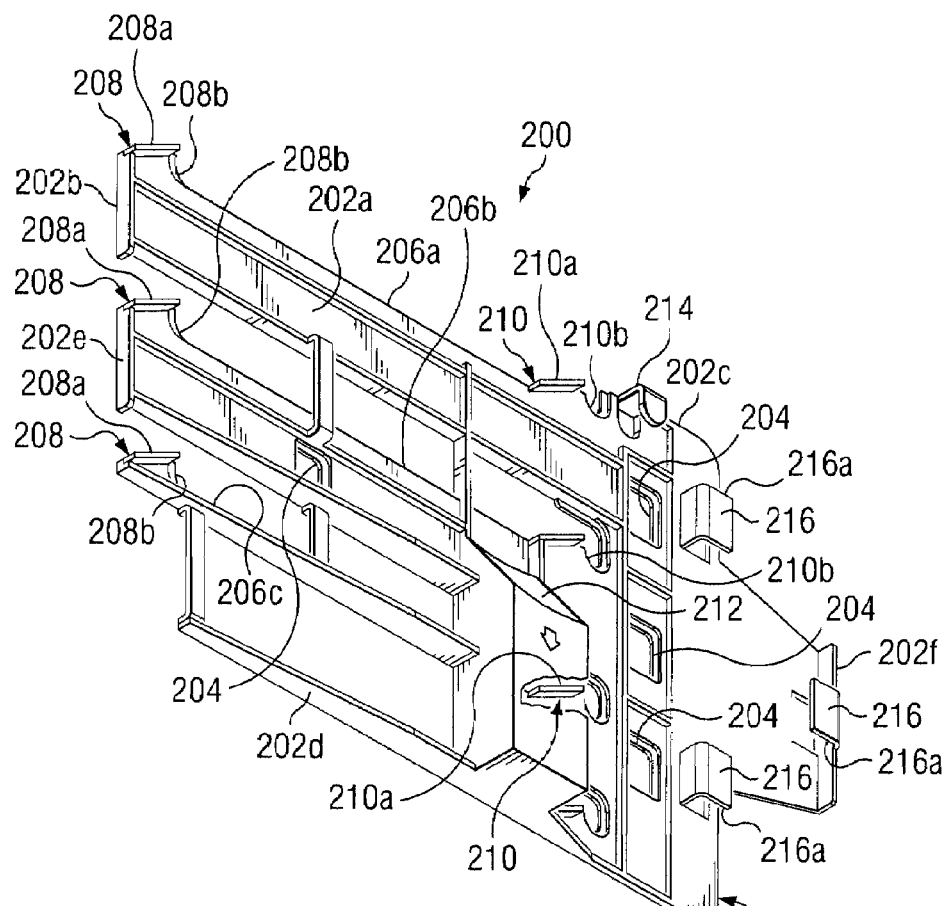
FIG. 2 is a perspective view illustrating an embodiment of a single securing member.

Referring now to FIG. 2, a single securing member 200 is illustrated. The single securing member 202 includes a base 202 having a front surface 202a, a rear surface 202b located opposite the front surface 202a, a top edge 202c extending between the front surface 202a and the rear surface 202b, a bottom edge 202d located opposite the top edge 202c and extending between the front surface 202a and the rear surface 202b, and a pair of opposing side edges 202e and 202f extending between front surface 202a and the rear surface 202b and oriented substantially perpendicularly to the top edge 202c and the bottom edge 202d. A plurality of chassis coupling apertures 204 are defined by the base 202 and extend through the base 202 from the front surface 202a to the rear surface 202b. A plurality of coupling channels 206a, 206b and 206c are defined by the base 202 and extend from the side edge 202e of the base 202 and into the base 202 in a substantially spaced apart and parallel orientation to each other. A pair of spaced apart coupling members 208 and 210 extend into each coupling channel 206a, 206b and 206c, with the coupling member 208 having a beveled surface 208a and a securing surface 208b located adjacent the beveled surface 208a and the coupling member 210 having a beveled surface 210a and a securing surface 210b located adjacent the beveled surface 210a. An actuation member 212 extends from the front surface 202a and is substantially centrally located between the side edges 202e and 202f on the base 202. A resilient member coupling beam 214 extends from the front surface 202a and the top edge 202c on the base 202 and is located adjacent a distal end of the channel 206a. A plurality of cable routing members 216 extend from the front surface 202a on the base 202 adjacent the side edge 202f in a spaced apart relationship from each other, each cable routing member 216 defining a cable routing channel 216a.

Referring now to FIG. 3, an IHS chassis 300 is illustrated. In an embodiment, the IHS chassis 300 may be, for example, the chassis 116, described above with reference to FIG. 1, and may house some or all of the components of the IHS 100, described above with reference to FIG. 1. The IHS chassis 300 includes a base 302 having a top wall 302a, a pair of opposing side walls 302b and 302c extending substantially perpendicularly from the top wall 302a, and a front wall 302d extending between the side walls 302b and 302c. A component bay 304 including a bay entrance 304a is defined by the base 302 and located between the top wall 302a, the side walls 302b and 302c, and the front wall 302d. A plurality of guide channels 306a, 306b, and 306c are defined by the side wall 302c, located adjacent the component bay 304, and extend from the side wall 302c adjacent the bay entrance 304a in a substantially spaced apart and parallel orientation to each other. A plurality of securing member coupling apertures 308 are defined by the side wall 302c and located adjacent the guide channels 306a, 306b and 306c. A plurality of guide channels 310a, 310b and 310c are defined by the side wall 302b, located adjacent the component bay 304, and extend from the side wall 302b adjacent the bay entrance 304a in a substantially spaced apart and parallel orientation to each other and substantially aligned with the guide channels 306a, 306b and 306c, respectively.

Figure 4A:
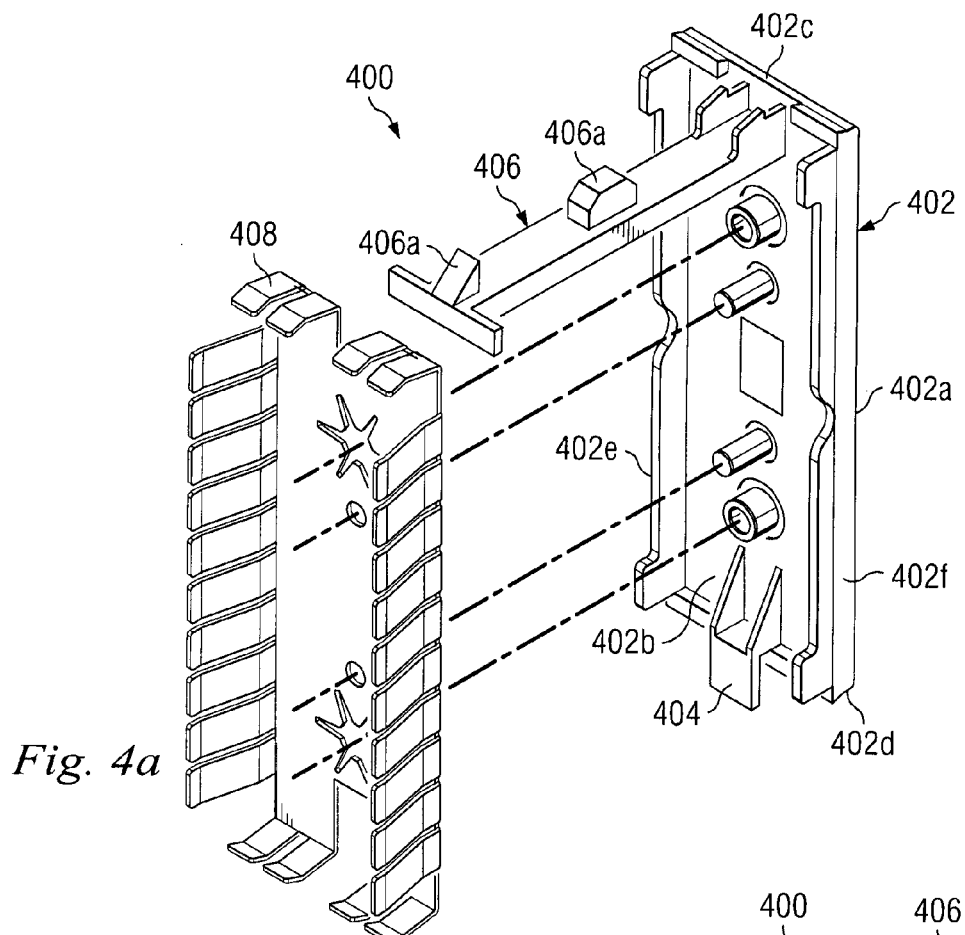
FIG. 4a is an exploded view illustrating an embodiment of a blank used with the single securing member of FIG. 2 and the IHS chassis of FIG. 3.
Figure 4B:
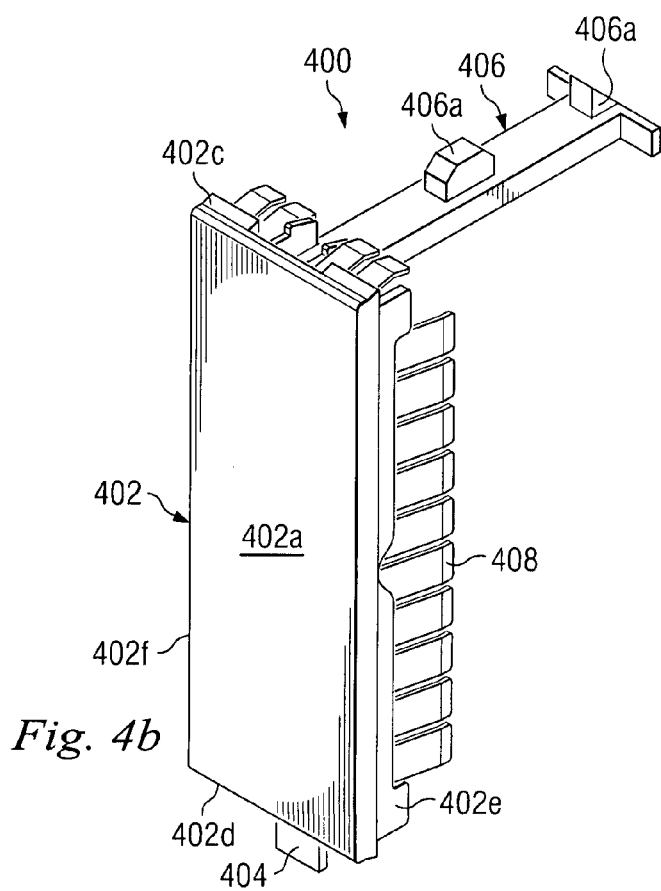

Referring now to FIGS. 4a and 4b, a blank 400 is illustrated. The blank 400 includes a base 402 having a top surface 402a, a bottom surface 402b located opposite the top surface 402a, a front edge 402c extending between the top surface 402a and the bottom surface 402b, a rear edge 402d located opposite the front edge 402c and extending between the top surface 402a and the bottom surface 402b, and a pair of opposing side edges 402e and 402f extending between the top surface 402a, the bottom surface 402b, the front edge 402c, and the rear edge 402d. A chassis engagement member 404 extends from the bottom surface 402b of the base 402 and out past the rear edge 402d of the base 402. A coupling arm 406 extends from the bottom surface 402b of the base 402 adjacent the front edge 402c in a substantially perpendicular orientation to the bottom surface 402b. A plurality of securing members 406a extend from the coupling arm 406 in a spaced apart orientation along its length. In an embodiment, a shield 408 may be coupled to the bottom surface 402b of the base 402, as illustrated.

Figure 5A:
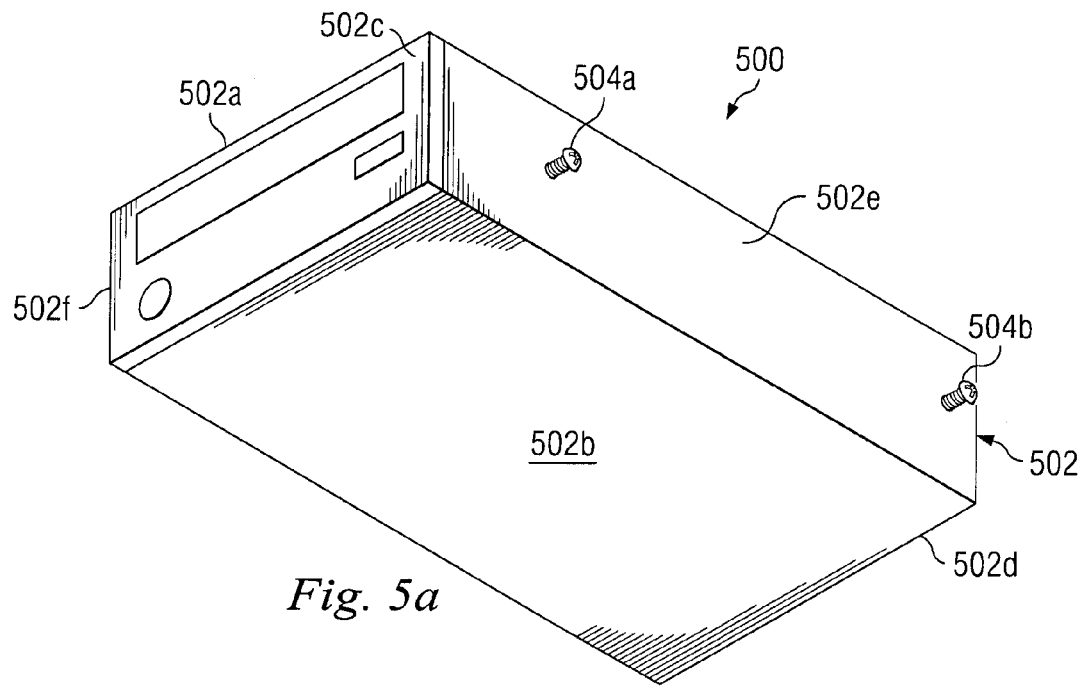
FIG. 5a is a perspective view illustrating an embodiment of a modular component used with the single securing member of FIG. 2 and the IHS chassis of FIG. 3.
Figure 5B:
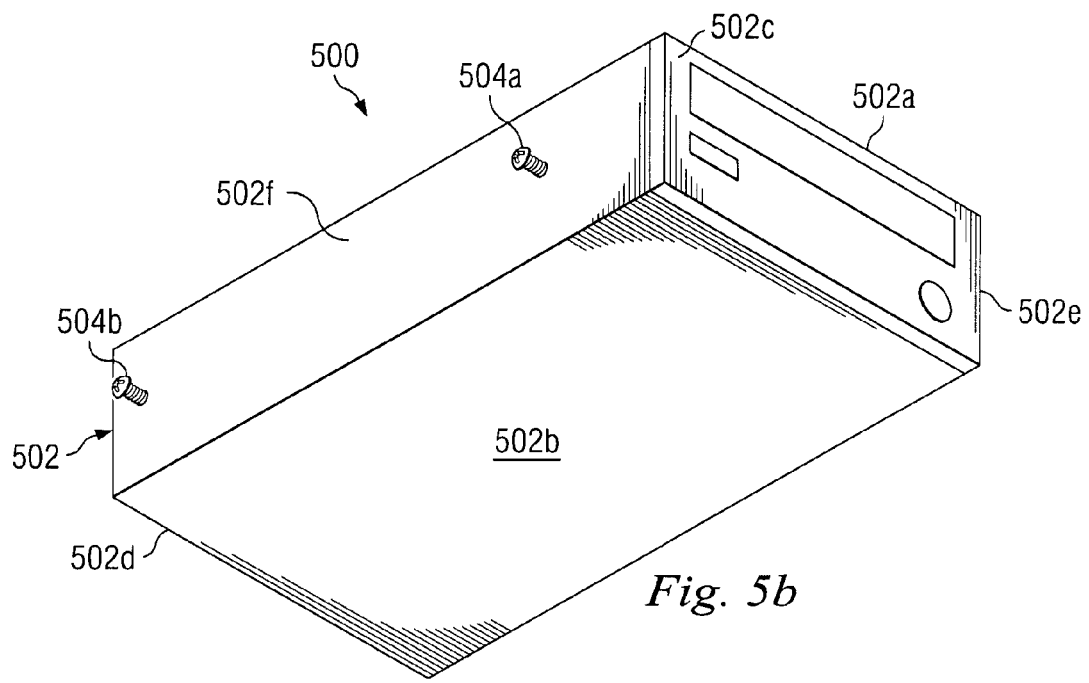

Referring now to FIGS. 5a and 5b, a modular component 500 is illustrated. The modular component 500 includes a base 502 having a top surface 502a, a bottom surface 502b located opposite the top surface 502a, a front surface 502c extending between the top surface 502a and the bottom surface 502b, a rear surface 502d located opposite the front surface 502c and extending between the top surface 502a and the bottom surface 502b, and a pair of opposing side surfaces 502e and 502f extending between the top surface 502a, the bottom surface 502b, the front surface 502c, and the rear surface 502d. Each side surface 502e and 502f includes a pair of coupling members 504a and 504b, with the coupling members 504a extending from the side surfaces 502e and 502f adjacent the front surface 502c and the coupling members 504b extending from the side surfaces 502e and 502f adjacent the rear surface 502d.

Figure 6A:
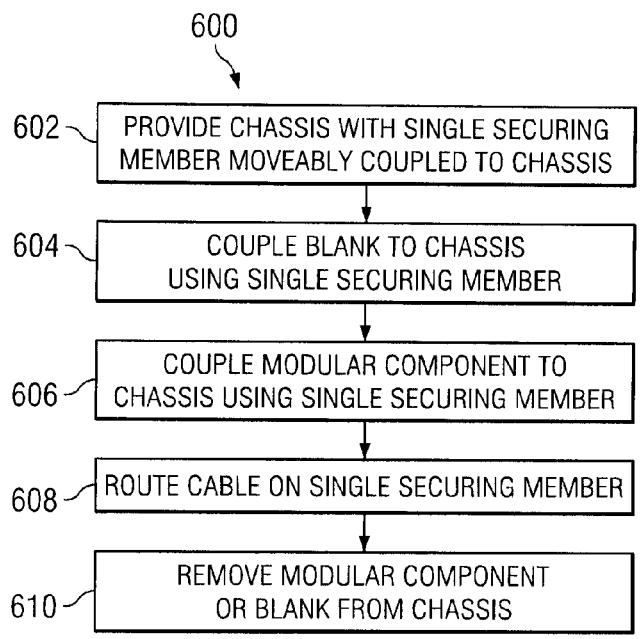
FIG. 6a is a flow chart illustrating an embodiment of a method for coupling a modular component and a blank to a chassis.
Figure 6C:
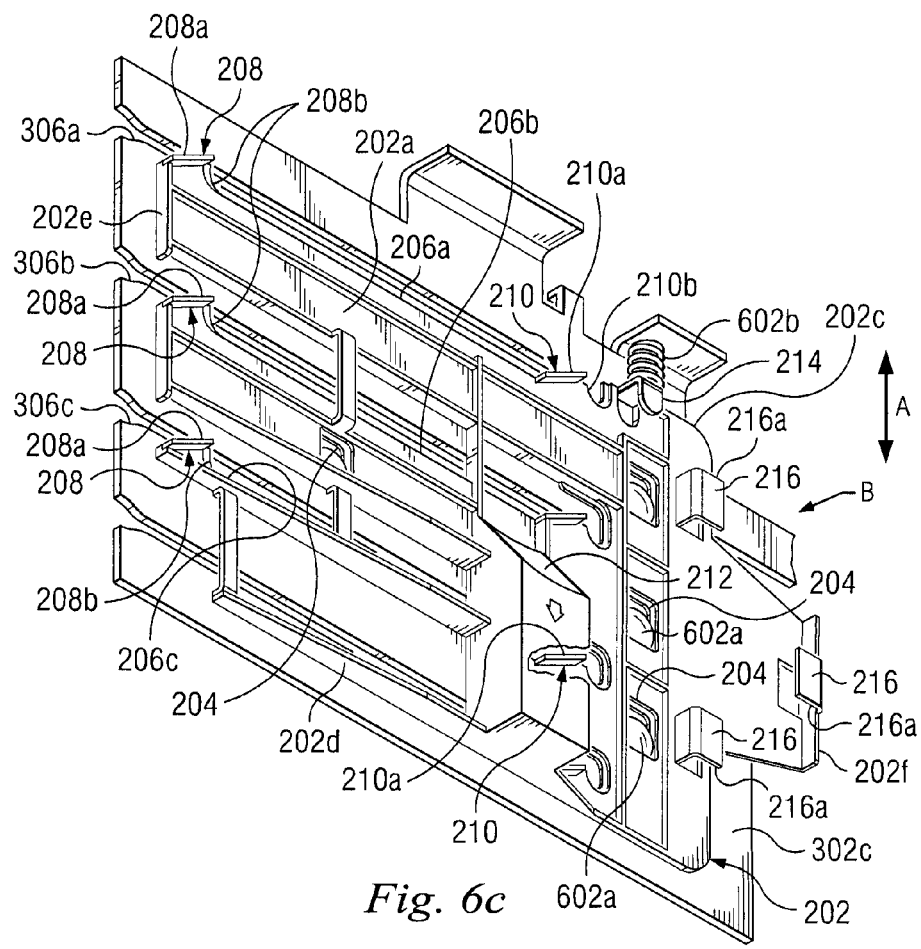
FIG. 6c is a cut-away perspective view illustrating an embodiment of the single securing member of FIG. 2 moveably coupled to a wall on the IHS chassis of FIG. 3.

Referring now to FIGS. 2, 3, 6a, 6b, and 6c, a method 600 for coupling a modular component and a blank to a chassis is illustrated. The method 600 begins at step 602 where a chassis with a single securing member moveably coupled to the chassis is provided. The single securing member 200, illustrated in FIG. 2, is moveably coupled to the IHS chassis 300, illustrated in FIG. 3, by positioning the single securing member 200 adjacent the side wall 302c on the IHS chassis 300 such that chassis coupling apertures 204 on the single securing member 200 are substantially aligned with the securing member coupling apertures 308 on the IHS chassis 300. A plurality of fasteners 602a are then located in the chassis coupling apertures 204 and the securing member coupling apertures 308 in order to couple the single securing member 200 to the IHS chassis 300, as illustrated in FIGS. 6b and 6c. A resilient member 602b is coupled to the resilient member coupling beam 214 on the single securing member 200 and the side wall 302c of the IHS chassis 300. With the single securing member 200 coupled to the IHS chassis 300, the fasteners 602a are allowed to slide through the chassis coupling apertures 204 such that the single securing member 200 may move relative to the IHS chassis 300 along a direction A, and the resilient member 602b resiliently biases the single securing member 200 into a securing position B such that the coupling members 208 and 210 on the single securing member 200 are located adjacent the guide channels 306a, 306b and 306c defined by the IHS chassis 300, as illustrated in FIGS. 6b and 6c.

Figure 6E:
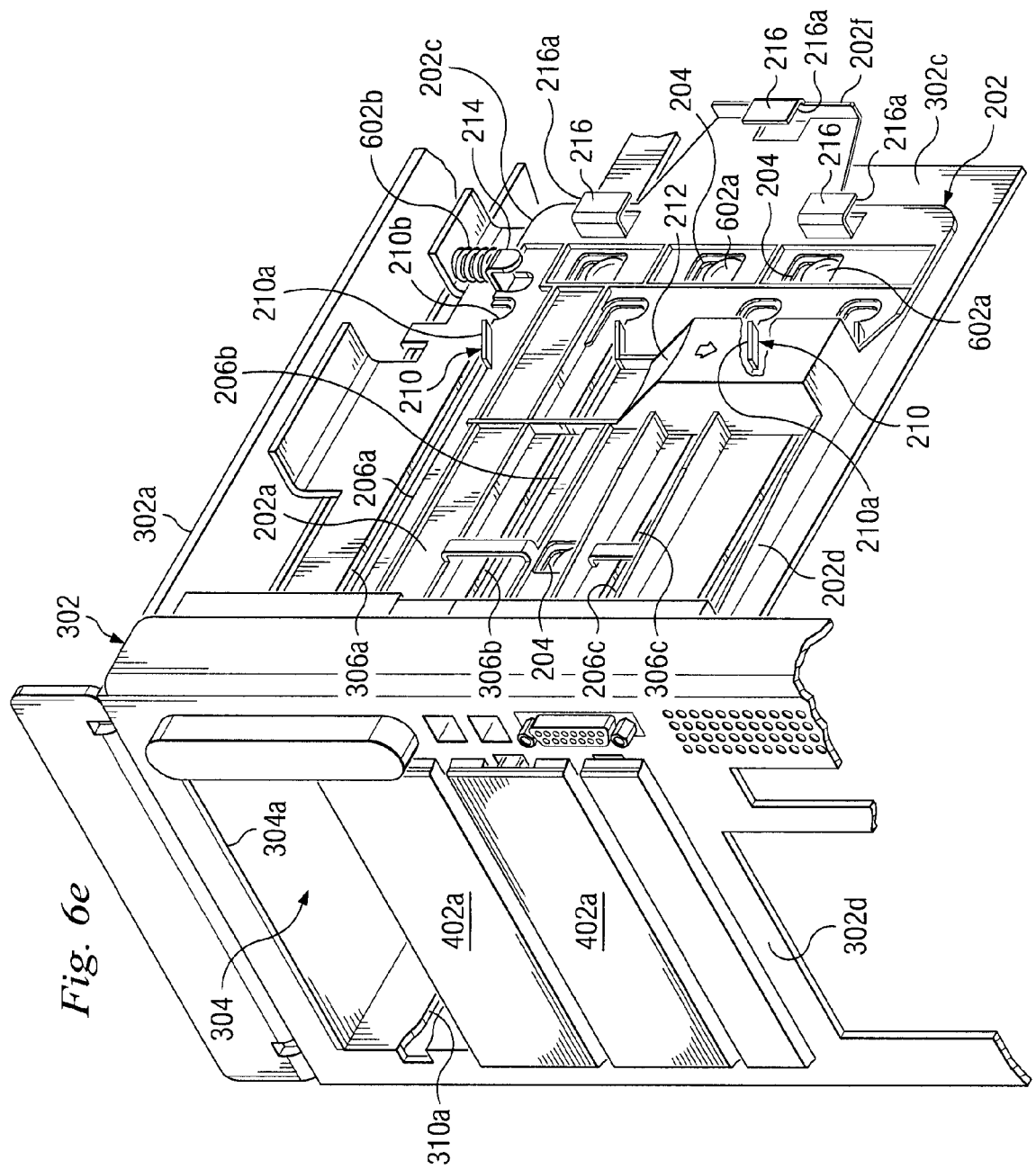
FIG. 6e is a perspective view illustrating an embodiment of the blank of FIGS. 4a and 4b coupled to the IHS chassis of FIG. 6b.
Figure 6F:
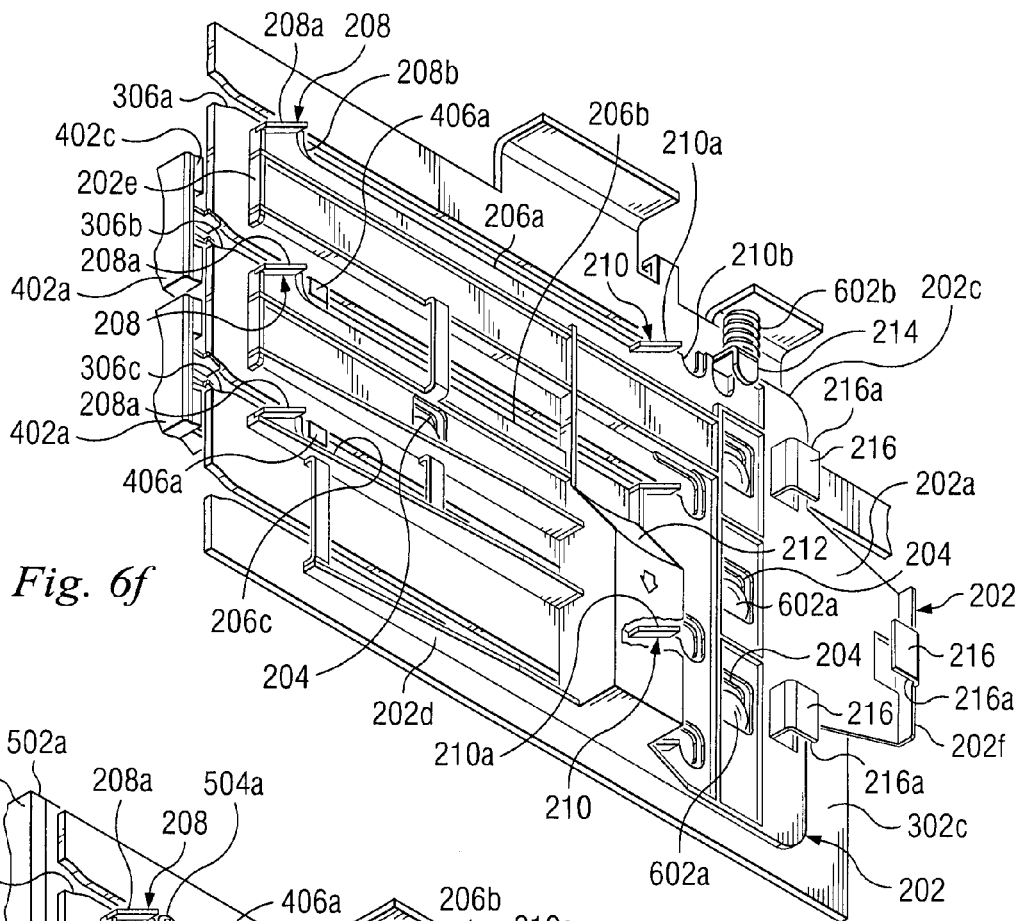
FIG. 6f is a cut-away perspective view illustrating an embodiment of the blank of FIGS. 4a and 4b coupled to the IHS chassis of FIG. 6c.
Figure 6I:
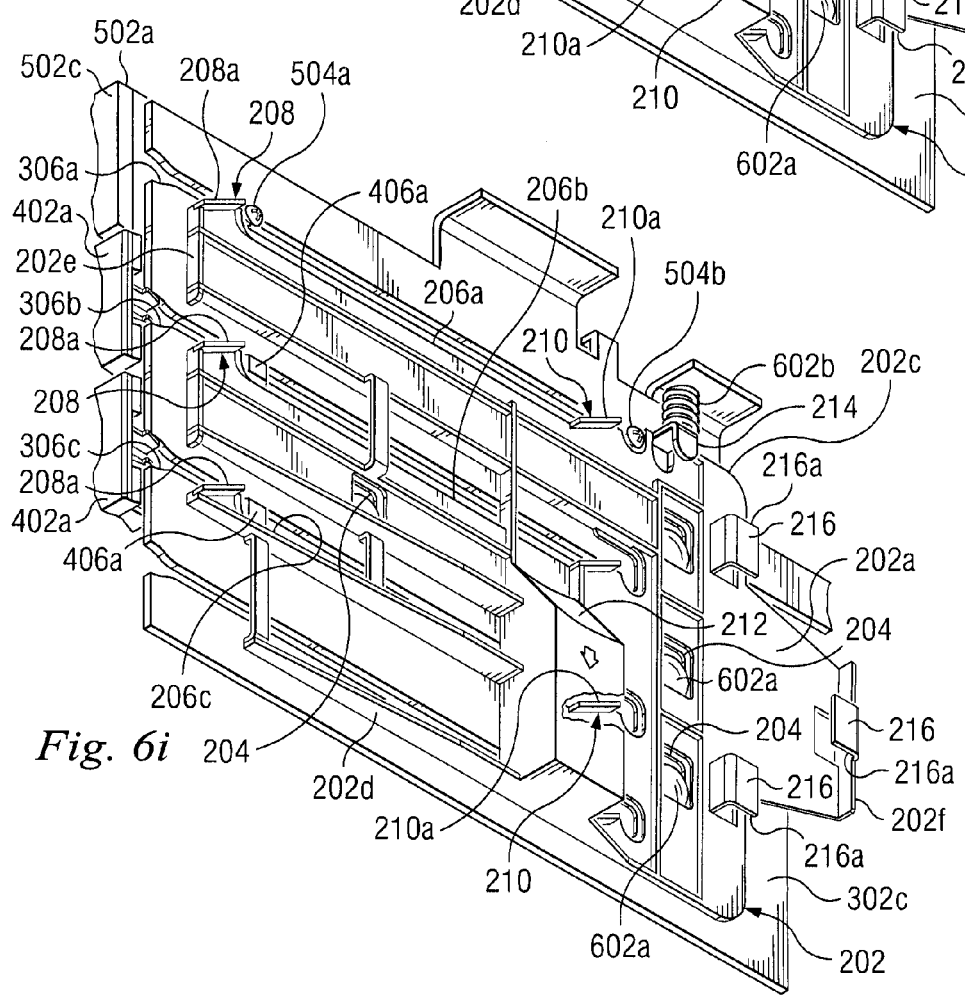
FIG. 6i is a cut-away perspective view illustrating an embodiment of the modular component of FIGS. 5a and 5b coupled to the IHS chassis of FIG. 6f.

Referring now to FIGS. 2, 3, 4a, 4b, 6a, 6d, 6e and 6f, the method 600 proceeds to step 604 where a blank is coupled to the chassis using the single securing member. The blank 400, illustrated in FIGS. 4a and 4b, may be coupled to the IHS chassis 300 by engaging the guide channel 310b on the IHS chassis 300 with the chassis engagement member 404 on the blank 400, as illustrated in FIG. 6d. The blank 400 is then pivoted about the engagement of the chassis engagement member 404 and the IHS chassis 300 such that the shield 408 and the coupling arm 406 enter the component bay 304. As the coupling arm 406 enters the component bay 304, the securing members 406a on the coupling arm 406 enter the guide channel 306b and then engage the beveled surface 208a of the coupling member 208 on the single securing member 200, moving the single securing member 200 along the direction A such that the coupling members 208 and 210 are no longer adjacent the guide channel 306b and the securing members 406a may continue moving through the guide channel 306b. As the securing members 406a pass the coupling member 208, the resilient member 602b resiliently biases the single securing member 200 back into the securing position B such that the securing surface 208b on the coupling member 208 engages the securing member 406a on the coupling arm 206 of the blank 400, securing the blank 400 to the IHS chassis 300, as illustrated in FIGS. 6e and 6f. A blank 400 may also be securing to the IHS chassis 300 using the single securing member 200 and the guide channel 306c in substantially the same manner as described above using the guide channel 306b.

Figure 6G:
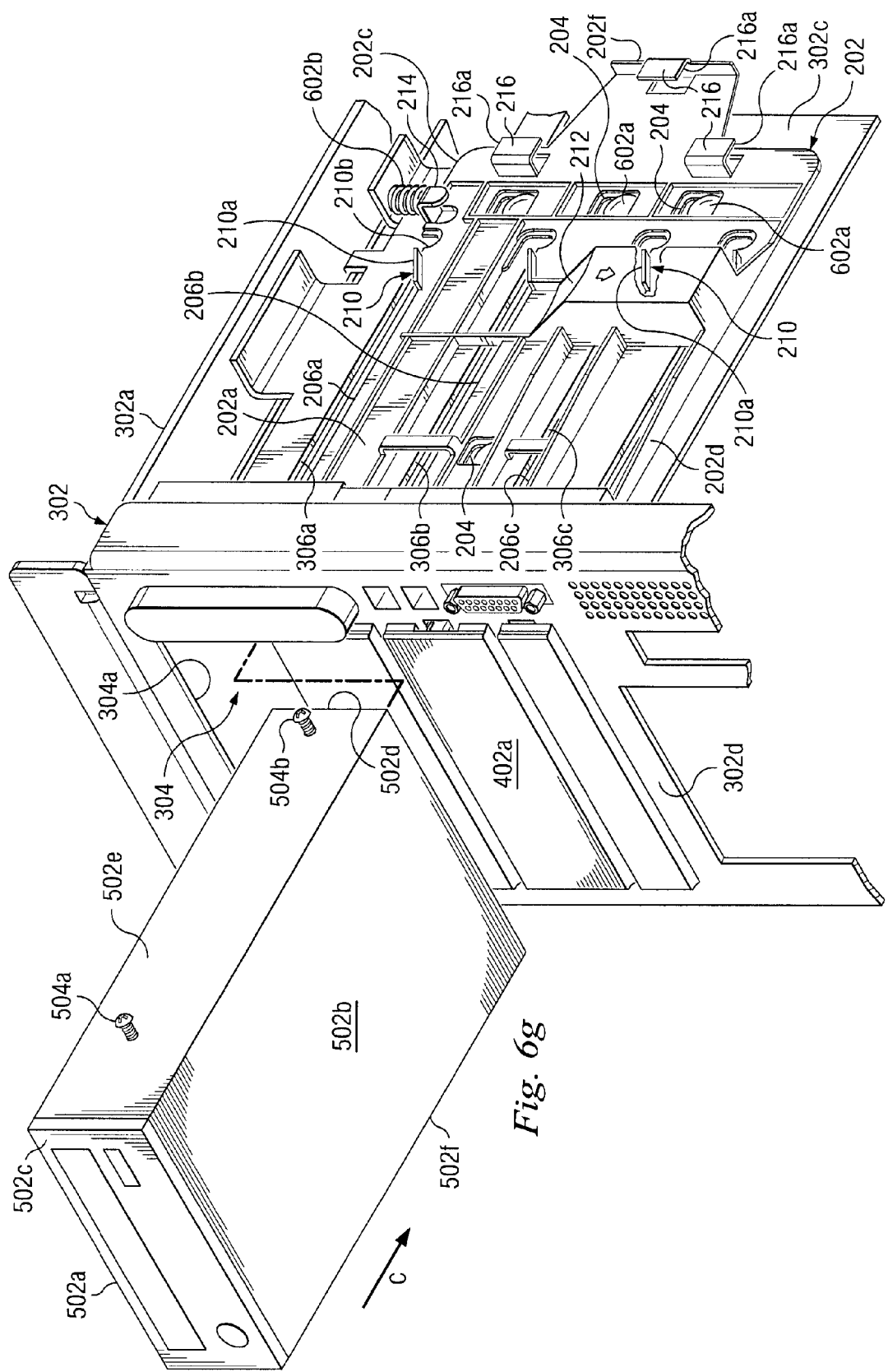
FIG. 6g is a perspective view illustrating an embodiment of the modular component of FIGS. 5a and 5b being coupled to the IHS chassis of FIG. 6e.
Figure 6H:
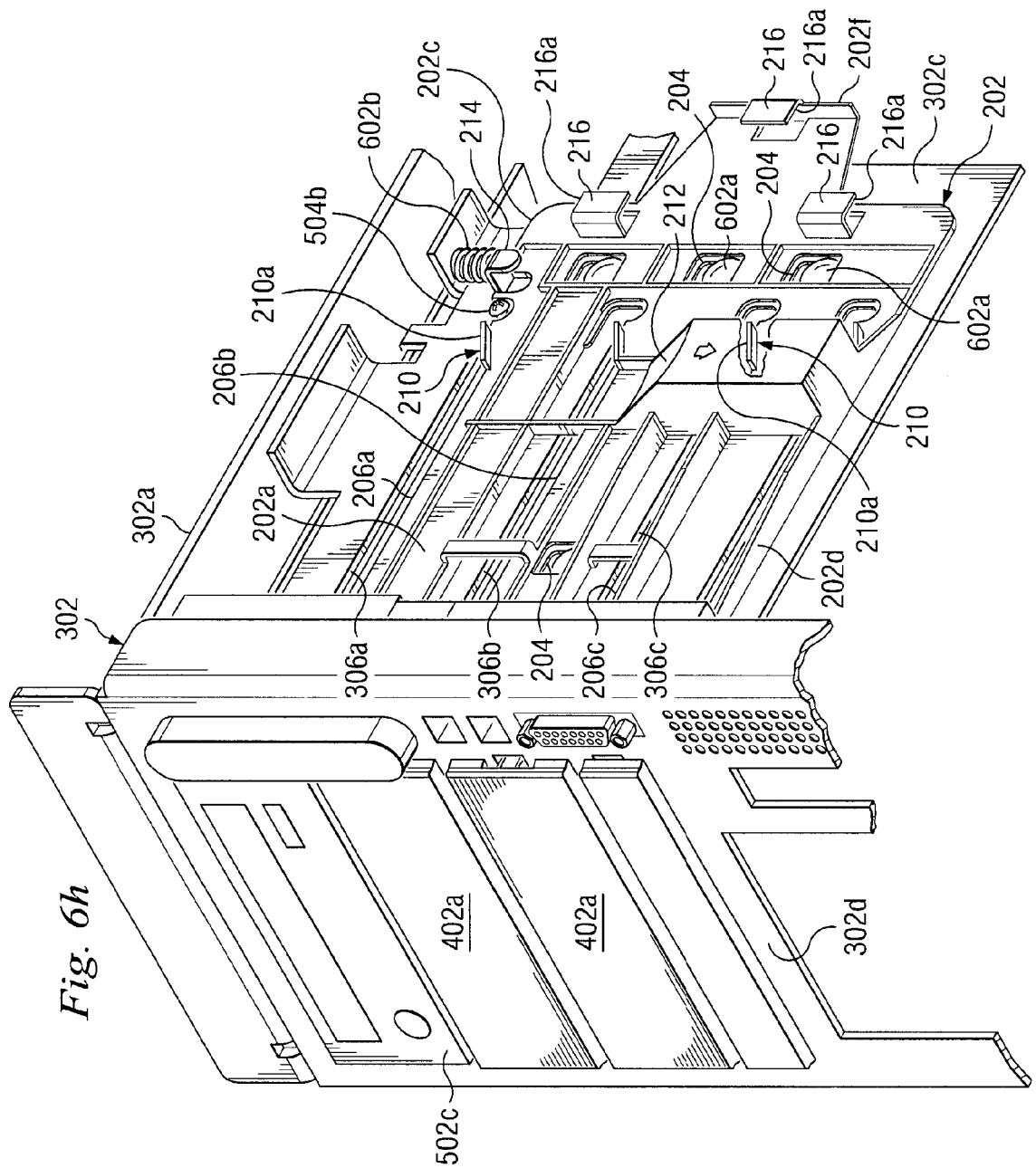
FIG. 6h is a perspective view illustrating an embodiment of the modular component of FIGS. 5a and 5b coupled to the IHS chassis of FIG. 6e.

Referring now to FIGS. 2, 3, 5a, 5b, 6a, 6g, 6h and 6i, the method 600 proceeds to step 606 where a modular component is coupled to the chassis using the single securing member. The modular component 500, illustrated in FIGS. 5a and 5b, is positioned adjacent the IHS chassis 300 such that the rear surface 502d of the modular component 500 is located adjacent the component bay 304 with the top surface 502a of the modular component 500 located adjacent the top wall 302a of the IHS chassis 300, and the side surfaces 502e and 502f of the modular component 500 located adjacent the side walls 302b and 302c, respectively, of the IHS chassis 300, as illustrated in FIG. 6g. The modular component 500 is then moved in a direction C such that the coupling members 504a and 504b extending from the side surface 502f of the modular component 500 enter the guide channel 310a on the IHS chassis 300 and the coupling members 504a and 504b extending from the side surface 502e of the modular component 500 enter the guide channel 306a on the IHS chassis 300. As the modular component 500 continues to move in the direction C, the coupling member 504b on side surface 502e engages the beveled surface 208a of the coupling member 208 on the single securing member 200, moving the single securing member 200 along the direction A such that the coupling members 208 and 210 are no longer adjacent the guide channel 306b and the coupling member 504b may continue moving through the guide channel 306a. As the modular component 500 continues to move in the direction C, the coupling members 504a and 504b engage the beveled surfaces 208a and 210a on the coupling members 208 and 210, respectively, moving the single securing member 200 along the direction A such that the coupling members 208 and 210 are no longer adjacent the guide channel 306b and the coupling members 504a and 504b may continue moving through the guide channel 306a. As the coupling members 504a and 504b pass the coupling members 208 and 210, respectively, the resilient member 602b resiliently biases the single securing member 200 back into the securing position B such that the securing surface 208b on the coupling member 208 engages the coupling member 504a on the modular component 500 and the securing surface 210b on the coupling member 210 engages the coupling member 504b on the modular component 500, securing the modular component 500 to the IHS chassis 300, as illustrated in FIGS. 6e and 6f. In an embodiment, an IHS connector (not shown) may be located adjacent the component bay 304 such that when the modular component 500 is secured to the IHS chassis 300, the IHS connector electrically couples the modular component 500 to, for example, the processor 102, described above with reference to FIG. 1.

Figure 6J:
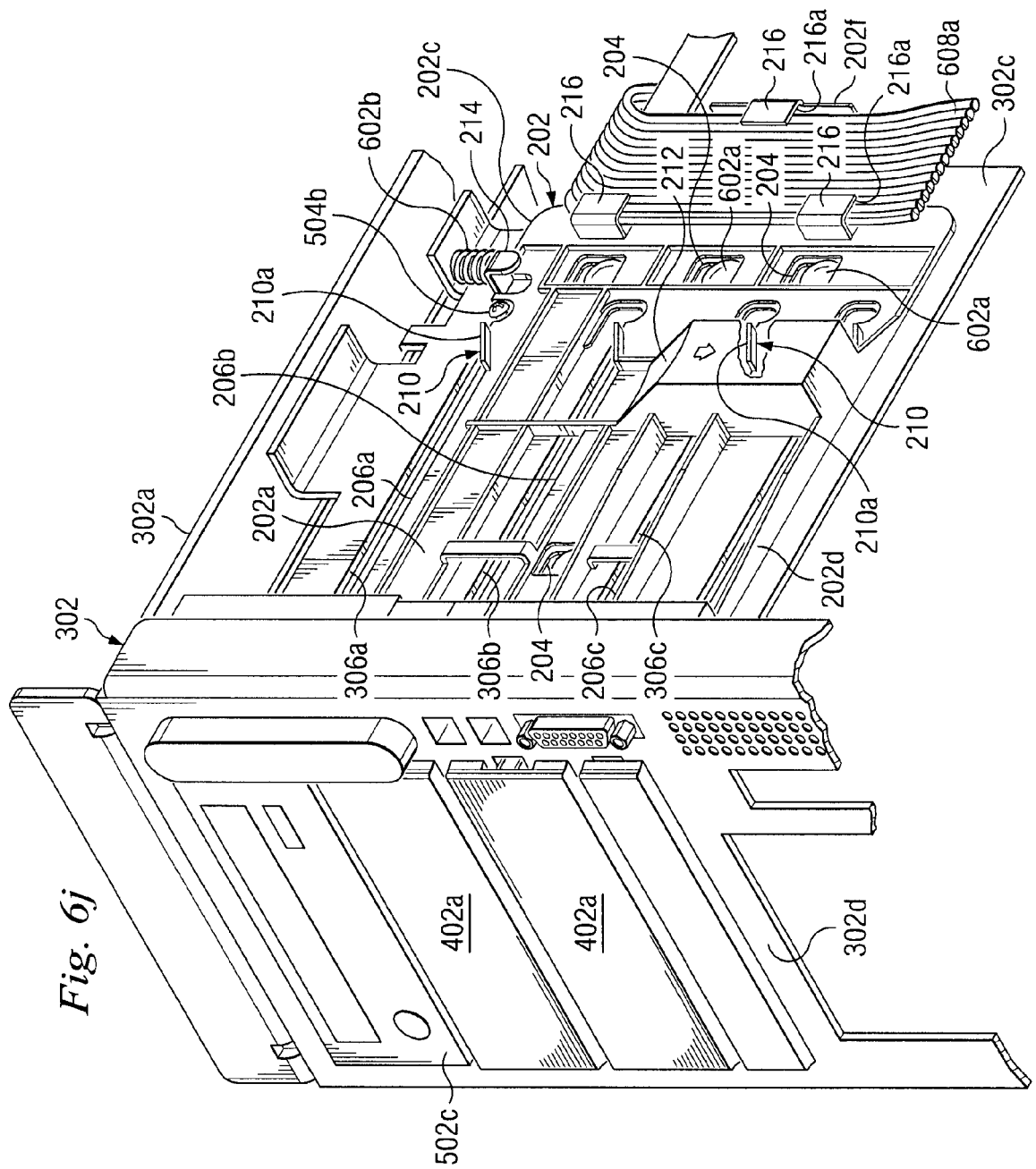
FIG. 6j is a perspective view illustrating an embodiment of a cable routed in the single securing member in the IHS chassis of FIG. 6h.

Referring now to FIGS. 2, 3, 6a and 6j, the method 600 proceeds to step 608 where a cable is routed on the single securing member. A cable 608a, which may be coupled to, for example, the processor 102, described above with reference to FIG. 1, is positioned in the cable routing channels 216a defined by the cable routing members 216, as illustrated in FIG. 6j. Due to the design of the cable routing members, the single securing member 200 may move relative to the cable 408a while the cable 408a is located in the cable routing channels 216a. This allows the modular component 500 and the blank 400 to be coupled to and decoupled from the IHS chassis 300 using the single securing member 200 while preventing the cable 408a from obstructing user touch points without having to remove the cable 408a from the single securing member 200. The method 500 then proceeds to step 610 where the modular component and/or the blank is removed from the IHS chassis. The modular component 500 and/or the blank 400 may be removed from the IHS chassis 300 by engaging the actuation member 212 to move the single securing member 200 in the direction A such that the coupling members 208 and 210 are no longer adjacent the guide channel 306b and either the coupling members 504a and 504b on the modular component 500 or the securing members 406a on the blank 400 may be moved through the guide channels 306a and 206b, respectively, such that the modular component 500 or the blank 400 may be removed from the IHS chassis 300. Thus, a method and apparatus are provided in which a single securing member is used to couple and decouple both a modular component and a blank to an IHS chassis, the single securing member offering a common access point for both the modular component and the blank.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A modular component and blank coupling apparatus, comprising:
   a chassis including a wall;
   a component bay defined by the chassis and located adjacent the wall;
   a plurality of guide channels defined by the wall and located adjacent the component bay;
   a single securing member moveably coupled to the wall adjacent the plurality of guide channels, wherein the single securing member is operable to movably receive both a modular component and a blank in order to secure the modular component and the blank to the chassis, and wherein the single securing member is operable to move out of engagement with the modular component and the blank in order to allow the modular component and the blank to be removed from the chassis;
   the single securing member including a plurality of coupling channels aligned with the guide channels, and each coupling channel including a first securing surface at a first end of the coupling channel and a second securing surface at a second end of the coupling channel distal from the first end;
   the blank including a securing member and the modular component including a pair of spaced apart securing members;
   in response to the blank being inserted into respective guide channels, the securing member engaging the first securing surface; and
   in response to the modular component being inserted into other respective guide channels, the pair of spaced apart securing members simultaneously engaging the first and second securing surfaces.

2. The apparatus of claim 1, wherein the single securing member is moveable in a direction that is substantially perpendicular to the guide channels.

3. The apparatus of claim 1, wherein the single securing member is resiliently biased into a securing position.

4. The apparatus of claim 1, wherein the single securing member comprises a plurality of securing surfaces that are operable to move with the securing member into and out of a securing position that is located immediately adjacent the plurality of guide channels.

5. The apparatus of claim 1, further comprising:
   an actuation member located on the single securing member and operable to move the single securing member.

6. The apparatus of claim 1, further comprising:
   a cable routing member extending from the single securing member and defining a cable routing channel; and
   a cable located in the cable routing channel, whereby the securing member and the cable routing member are operable to move relative to the cable.

7. The apparatus of claim 1, further comprising:
   a blank comprising a coupling arm extending from the blank, wherein the coupling arm is located in one of the guide channels and engages the single securing member through the guide channel in order to couple the blank to the chassis.

8. The apparatus of claim 1, further comprising:
   a modular component located in the component bay and engaging the single securing member through one of the guide channels in order to couple the modular component to the chassis.

9. An information handling system, comprising:
   an information handling system chassis including a wall;
   a processor housed in the information handling system chassis;
   a component bay defined by the chassis and located adjacent the wall;
   an information handling system connector located adjacent the component bay and electrically coupled to the processor;
   a plurality of guide channels defined by the wall and located adjacent the component bay;
   a single securing member moveably coupled to the wall adjacent the plurality of guide channels;
   the single securing member including a plurality of coupling channels aligned with the guide channels, and each coupling channel including a first securing surface at a first end of the coupling channel and a second securing surface at a second end of the coupling channel distal from the first end;
   a blank including a securing member and a modular component including a pair of spaced apart securing members;
   in response to the blank being inserted into respective guide channels, the securing member engaging the first securing surface; and
   in response to the modular component being inserted into other respective guide channels, the pair of spaced apart securing members simultaneously engaging the first and second securing surfaces.

10. The system of claim 9, wherein the single securing member is moveable in a direction that is substantially perpendicular to the guide channels in order to engage and disengage the single securing member with the modular component and the blank.

11. The system of claim 9, wherein the single securing member is resiliently biased into a securing position such that the single securing member engages the modular component and the blank.

12. The system of claim 9, wherein the single securing member comprises a plurality of securing surfaces that are operable to move with the securing member into and out of a securing position that is located immediately adjacent the plurality of guide channels.

13. The system of claim 9, further comprising:
   an actuation member located on the single securing member and operable to move the single securing member out of engagement with the modular component and the blank.

14. The system of claim 9, further comprising:
   a cable routing member extending from the single securing member and defining a cable routing channel; and
   a cable located in the cable routing channel, whereby the securing member and the cable routing member are operable to move relative to the cable.

15. The system of claim 9, wherein the single securing member is operable to move out of engagement with the modular component and the blank in order to allow the modular component and the blank to be removed from the information handling system chassis.

* * * * *

UNITED STATES PATENT AND TRADEMARK OFFICE
CERTIFICATE OF CORRECTION

| | | |
|---|---|---|
| PATENT NO. | : 7,652,879 B2 | Page 1 of 1 |
| APPLICATION NO. | : 11/611587 | |
| DATED | : January 26, 2010 | |
| INVENTOR(S) | : Hartman et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 426 days.

Signed and Sealed this

Twenty-third Day of November, 2010

David J. Kappos
*Director of the United States Patent and Trademark Office*